United States Patent
Paakkinen

(10) Patent No.: US 9,644,602 B2
(45) Date of Patent: May 9, 2017

(54) WAVE POWER PLANT

(71) Applicant: Wello Oy, Espoo (FI)

(72) Inventor: Heikki Paakkinen, Espoo (FI)

(73) Assignee: WELLO OY, Espoo (FI)

( * ) Notice: Subject to any disclaimer, the term of this patent is extended or adjusted under 35 U.S.C. 154(b) by 137 days.

(21) Appl. No.: 14/410,051

(22) PCT Filed: Jun. 19, 2013

(86) PCT No.: PCT/FI2013/050672
§ 371 (c)(1),
(2) Date: Dec. 19, 2014

(87) PCT Pub. No.: WO2014/001627
PCT Pub. Date: Jan. 3, 2014

(65) Prior Publication Data
US 2015/0123406 A1 May 7, 2015

(30) Foreign Application Priority Data

Jun. 27, 2012 (FI) ..................... 20125732

(51) Int. Cl.
 F03B 13/18 (2006.01)
 E02B 9/08 (2006.01)
 F03B 13/20 (2006.01)

(52) U.S. Cl.
 CPC ............... *F03B 13/18* (2013.01); *E02B 9/08* (2013.01); *F03B 13/1825* (2013.01); *F03B 13/20* (2013.01); *Y02E 10/38* (2013.01)

(58) Field of Classification Search
 CPC ........ F03B 13/145; F03B 13/16; F03B 13/18; F03B 13/1825; F03B 13/20; E02B 9/08; Y02E 10/38
 (Continued)

(56) References Cited

U.S. PATENT DOCUMENTS 613,075 A * 10/1898 Pitts ..................... F03B 13/187
 185/30
4,352,023 A 9/1982 Sachs et al.
 (Continued)

FOREIGN PATENT DOCUMENTS

CH 114164 Y1 11/1926
EP 1 384 824 B1 3/2002
 (Continued)

OTHER PUBLICATIONS

Finnish Search Report, dated Apr. 25, 2013, Application No. 20125732.
 (Continued)

*Primary Examiner* — Thai Ba Trieu
*Assistant Examiner* — Mickey France
(74) *Attorney, Agent, or Firm* — Knobbe Martens Olson & Bear, LLP

(57) ABSTRACT

A wave power plant (1), comprising a body (1) and a rotator (3) supported on the body. The body (1) is a rather flat, panel type element, which is moored with respect to the propagation direction of waves in such a way that the dimension of the body (1) in the propagation direction of waves is smaller than the draft of the body (1). The body (1) has its diagonally opposite corners provided with substantially horizontally protruding fins (4, 5), which bring about swaying of the body (1) in lateral direction, i.e. in the plane of the panel type element, in response to the vertical motion of water.

12 Claims, 3 Drawing Sheets

(58) Field of Classification Search
USPC ...... 60/495–507; 417/100, 330–337; 290/42, 290/53
See application file for complete search history.

(56) References Cited

U.S. PATENT DOCUMENTS

| | | |
|---|---|---|
| 7,375,436 B1 | 5/2008 | Goldin |
| 2004/0007880 A1 | 1/2004 | French |
| 2009/0309366 A1* | 12/2009 | Moore .................... B63B 35/44 290/53 |
| 2010/0320766 A1 | 12/2010 | Klukowski |
| 2011/0089690 A1* | 4/2011 | Babarit .................. F03B 13/20 290/42 |

FOREIGN PATENT DOCUMENTS

| | | |
|---|---|---|
| GB | 297720 A | 9/1928 |
| GB | 2325708 A | 12/1998 |
| JP | S4426008 A | 10/1969 |
| JP | S6325571 A | 10/1988 |
| JP | 2001193626 A | 7/2001 |
| WO | WO 2005/071257 A1 | 1/2005 |
| WO | WO 2007072016 A1 | 6/2007 |
| WO | WO 2008006145 A1 | 1/2008 |

OTHER PUBLICATIONS

International Search Report dated Oct. 13, 2013, Application No. PCT/FI2013/050672.
Written Opinion dated Oct. 14, 2013, Application No. PCT/FI2013/050672.
European Search Report dated Feb. 23, 2016 for Application No. EP13809188.

\* cited by examiner

WAVE POWER PLANT

The invention relates to a wave power plant, comprising a body and a rotator supported on the body.

One type of wave power plants used for the utilization of wave energy is represented by devices, wherein the gyro spin angular momentum is used for generating a torque for the rotator as the gyro axis is swayed by the action of waves. One problem with these wave power plants representing the prior art is falsely timed acceleration applied to the device and caused by horizontal wave motion. This is unfavorable for the operation of a rotator revolving around the gyro axis. Hence, it decelerates the rotor motion and in a worst case scenario may even cancel momentarily the entire output.

This power plant type is represented for example by solutions disclosed in publications EP 1,384,824 B1 and WO2005/071257 A1. The rotator shaft is only briefly provided with a torque promoting its rotation twice during a full revolution of the rotator, while during interim periods, as the gyro axis is turning, the gyro spin angular momentum generates a body-tilting torque. If allowed to tilt in the direction of a torque, the body performs useless work and decelerates rotation of the rotator. Accordingly, the rotator's rotation is difficult to obtain and it is difficult to enable the body of a wave power plant to swing in rhythm with the waves. The wave power plant is quite inefficient in operation and the power plant is difficult to deploy in irregular waves.

Furthermore, the publication U.S. Pat. No. 7,375,436 B1 discloses a wave power plant, wherein a gyro force-induced moment, which is generated by the fluctuation (swaying) of the power plant, is employed for driving a rotator. What has been examined in the publication is a power output of the plant at various gyro spin speeds with respect to wave frequency. The rotator driving moment is obtained in a pulsed manner twice during a revolution, i.e. it is irregular, and rotation of the rotator is difficult to synchronize with wave frequency in shifting wave conditions. In addition, the output is modest. The performance is particularly undermined by the fact that the floating body keeps tilting in compliance with the direction of a wave surface, whereby the moments induced by horizontal accelerations coincide with a stage at which the moments generated by tilting and gravitation are largely cancelled thereby. In this case, it is only the gyro force that can be exploited.

Moreover, the Applicant's earlier Finnish patent application FI 20125413 A discloses one solution for optimizing the coordination of tilt fluctuations and moments of the body. There, the body has been designed as a vertical or slanting wall submerged to a sufficient depth. By making use of intra-wave currents, it is possible to obtain such a tilt fluctuation stage for the body that the moment generated by horizontal acceleration can also be exploited. This is not possible with bodies whose floating is determined by the direction of a wave surface.

The moments generated by inclination and acceleration are now summed up together for a dead weight torque, and the gyro-induced torque and the dead weight-induced torque alternate during a revolution of the rotator and each torque is applied two times during the revolution, thus providing torques recurring typically at about 90° intervals and striving to rotate the rotator in the same rotating direction. This arrangement is advantageous with horizontally long bodies. If the horizontal length of a body is in the same order as its height, the action can be further enhanced with arrangements in which the body can be set in a gyratory motion, i.e. the inclination of the rotator shaft can be set to revolve around a theoretical vertical axis instead of the rotator shaft tilting back and forth. Thus, the rotator-turning inclination moment is always available. Likewise, the gyro-generated moment is continuous over the entire revolution.

The power plant is also highly functional when driven by a rotator alone, without a gyro.

It is an objective of the invention to provide an improved wave power plant, which enables the generation of a gyratory motion as pure as possible for a rotator shaft and thereby enables a continuous spinning motion and energy production as consistent as possible even in irregular waves. In other words, the invention seeks to improve the output capacity and operating facilities of a wave power plant in changing wave conditions.

This objective is attained with a wave power plant of the invention on the basis of features presented in the appended claim 1. Preferred embodiments of the invention are presented in the dependent claims.

A realization in the invention is to create capabilities for the constant tilting of a body plane to occur simultaneously both in a direction perpendicular to the plane and co-directionally with the plane, resulting in a hybrid movement in the form of gyratory motion. In this case, the gyratory motion refers to a conical trajectory of the rotator shaft, whereby the cone has a cross-sectional shape other than circular, e.g. oval.

In addition, the invention also provides a capability of utilizing a merit of the Applicant's earlier patent application, wherein the tilting motion and the horizontal accelerations come together at such a stage that the moments of inclination/gravitation and acceleration enhance each other. In addition, the moment of gyro force can be used as a rotation equalizer for the rotator. This results in a powerful and relatively consistent moment and a high power output.

The wave power plant of the invention provides a high efficiency and a reasonably consistent rate of yielding power regardless of the wave size as the dimensions (length/height) of mostly occurring, typical natural waves are more or less constant.

In the solution according to the invention, the pitch motion or jolting occurs in a direction opposite to the inclination of a wave surface. Hence, the wave power plant has its body and the rotator has its shaft swinging towards the wave. The pitch motion occurring in the wave propagation direction is a result of the internal movement of water. In the invention, the constant tilting of a floating body is caused in the way of deviating from the direction of a wave surface by intra-wave currents applied to a submerged portion of the body. This submerged portion of the body extends to such a depth that the currents (horizontal) of various speeds present inside the wave can be effectively brought to induce longitudinal tilting motions of the body.

A large panel type surface makes highly effective use of the horizontal motion of a wave over most of the sphere of influence of the wave. In the case of a small wave, the wave shall be exploited over its entire sphere of influence. In vertical direction, the device reaches a depth equal to where wave motion exists.

By always tilting towards a wave, the body has its inclination moment and acceleration moment enhancing each other. Thus, the body is forced to perform a gyratory motion, because the horizontal movements of water generate heaving motions of the body's plane simultaneously with lateral tilting induced by a solution of the invention. The gyration generated by crosswise tilting motions is related to the wave at a beneficial stage and the gravitational action performance of a rotator is enhanced by horizontal acceleration.

In a wave power plant of the invention, the rotator appropriate for gravitational power takeout can be substantially lighter than e.g. in the wave power plant presented in the publication WO2010/034888, because some of the rotator torque can be produced with spin angular momentum. A particularly significant benefit with respect to prior known wave power plants is attained by the invention for the reason that the moments caused by inclination and acceleration become summed up with each other for a dead weight torque.

Having the body designed as a vertical or slanting wall submerged to a sufficient depth, it is possible, by the deployment of intra-wave currents, that the body be provided with such a stage in terms of its constant tilting that the moment caused by horizontal acceleration can also be exploited, which is not possible with bodies whose floating is determined by the direction of a wave surface. In addition, the invention provides a torque as consistent and effective as possible over the entire cycle.

The invention will now be illustratively described even more precisely with reference to the accompanying drawings, in which.

Figure 1:
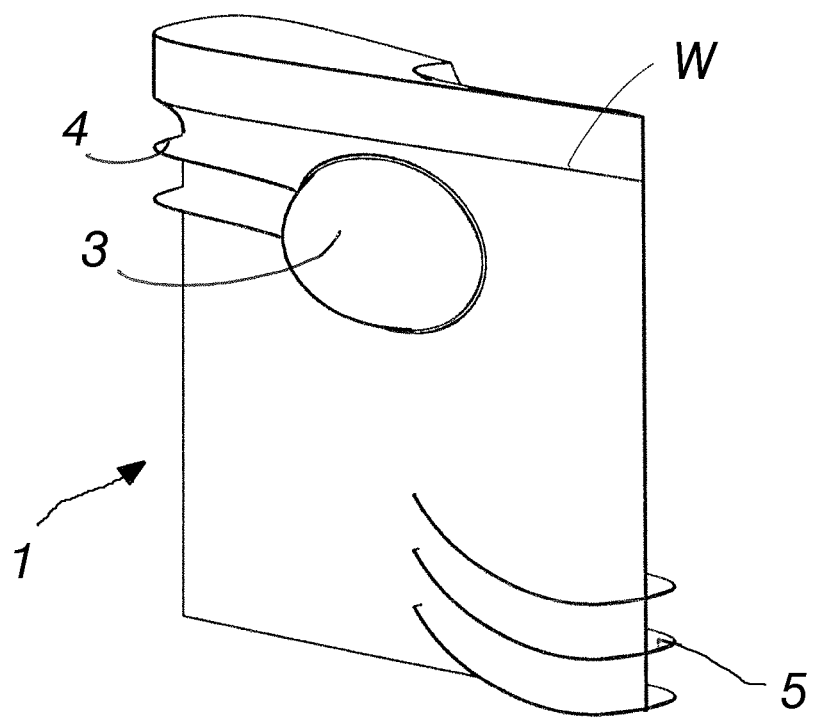
FIG. 1 shows schematically in an oblique view from above a wave power plant body component according to one embodiment of the invention.
Figure 2:
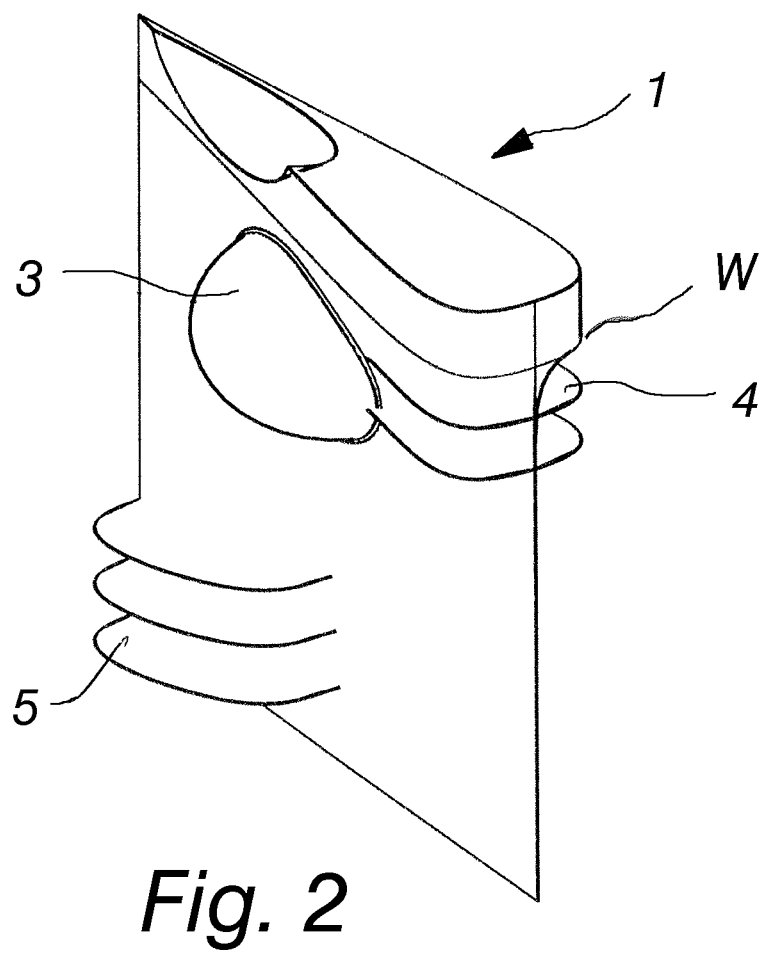
FIG. 2 shows the body component of FIG. 1 in a view from the opposite side.
Figure 3:
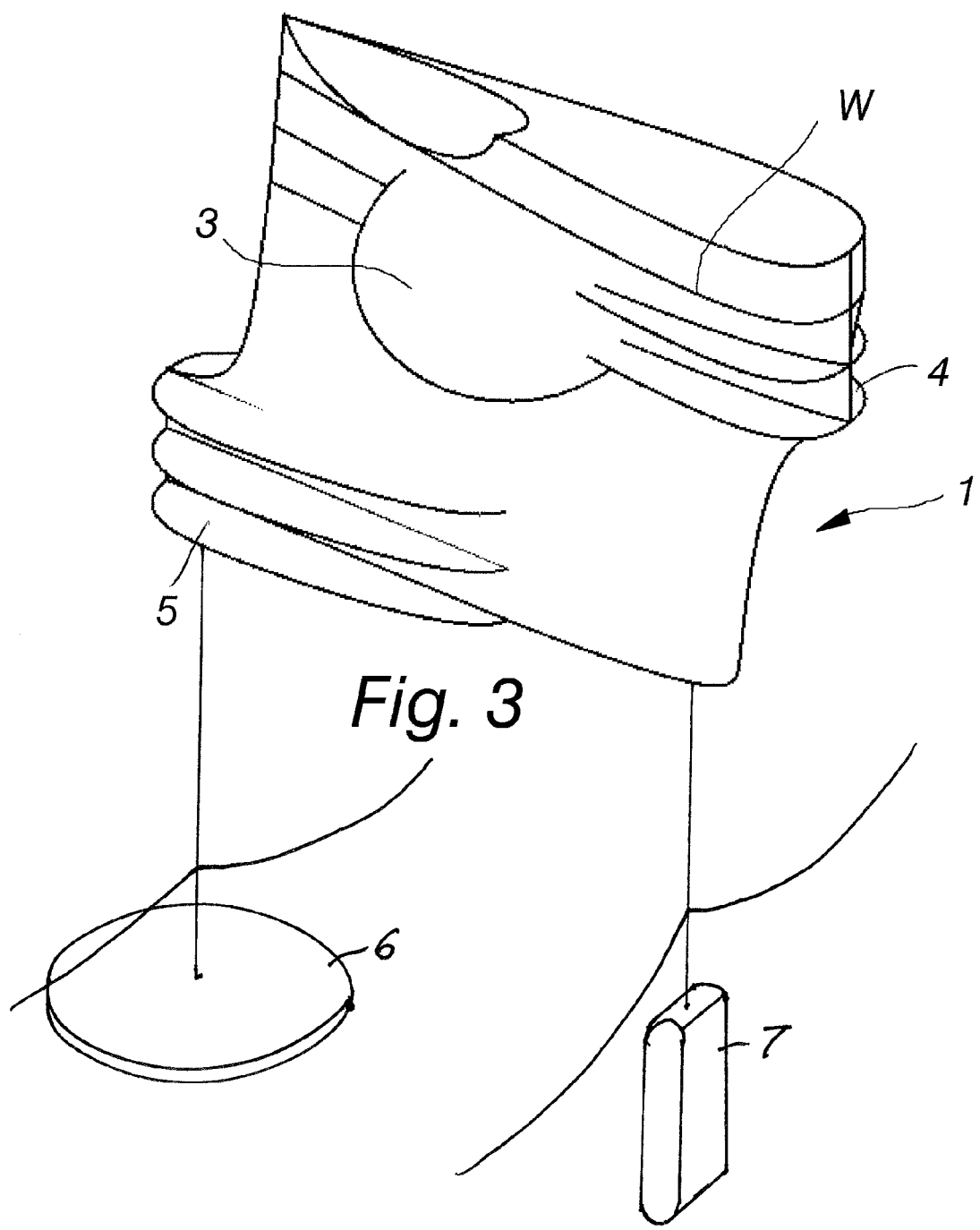
FIG. 3 shows a slanted body component in an oblique view from above.

FIGS. 1-3 show one preferred embodiment for a wave power plant body element 1 of the invention in schematic diagrams. The body 1 is a substantially vertical or in operation averagely vertical tilting wall, which is for the most part under the water level, yet with its top section above the water level. In calm water, the water level coincides roughly with a line W. A wall type shape and a substantially vertical main plane orientation of the body convert the flowing energy of waves into the kinetic energy of the body effectively and with a large surface area. The body is moored for an orientation with its main plane transverse to the propagation direction of waves.

The submerged body section has its vertical dimension typically exceeding its horizontal cross-sectional dimension. In the exemplified preferred embodiment, the top section of the body has a horizontal cross-section which in its overall outline resembles a narrow stretched drop. The shortest body dimension is co-directional with the propagation of wave. One side is very thin and the other has a larger volume. On the other hand, more than 80% of the body height is in submersion when the body is in still water.

A rotator 3 is positioned in a top section of the body 1 with mooring points at the bottom corners of the body. The rotator is subjected to major horizontal accelerations with the body in a constant tilting motion in response to intra-wave currents. The body 1 has its top designed as a solid surface.

The wave power plant body, its external surface, is in this invention provided with fins or vanes 4 and 5, which extend from the main body plane and which are designed to be stationary. A stationary arrangement of fins or vanes is appropriate particularly in a sea installation and is additionally reliable in operation and maintenance-free.

At least over a portion of the length thereof, the fins or vanes 4, 5 are substantially horizontal. The fins or vanes are present on both sides of the main plane and extend from the main plane in a direction substantially perpendicular to the main plane.

The panel type body 1 has its diagonally opposite corners provided with the fins or vanes 4 and 5 which are substantially horizontal at least over a portion of their length. Thus, on the opposite sides of a vertical midline of the body, these fins or vanes are present at different heights and enable the body to sway in lateral direction in response to the vertical movement of water. Near the surface, at a top portion of the body, the movement of water is more extensive and at a bottom portion of the device it is less extensive. With a small wave, there is no wave-induced movement at all in the bottom portion of the body. Therefore, the fins or vanes 4 and 5, which are located at unequal heights in opposite corners, receive an oppositely directed pressure/force prompting the device to sway in lateral direction, i.e. in the main plane of the body around an axis perpendicular to the main plane. The main plane refers to the largest vertical plane or projection in the vertical plane of a body standing in still water.

In the wave power plant body 1, the buoyancy-generating overwater volume has a very narrow design at the edge where the fins 5 are in a low position. Hence, the body's buoyancy resists as little as possible the force and movement, which is generated by said fins or vanes and which is oppositely phased relative to the surface of water.

On the other hand, at the other edge in the vicinity of the fins or vanes 4 in a high position, the volume is larger. The purpose is to enable this particular side of the body to trace as effectively as possible the vertical movement of a wave.

A component of the body 1, which penetrates the water surface, has been designed to be short in the wave propagation direction, such that the water-generated buoyancy in the proximity of the surface would not oppose pitching. It is namely the case that the buoyancy (pressure) generates torque in a direction which is opposite to what is generated by the intra-wave motion when the surface of water is in inclination.

The body is further provided with a preferably substantially round spherical space (flat sphere), in which the rotator 3 is located. It can be placed under water for having the water surface penetrated by a narrow volume. According to another embodiment of the invention, on the other hand, this spherical space is located substantially above the water level for likewise maintaining a narrow (short) area for the horizontal section penetrating the water surface. For structural and practical reasons, the rotator space may also be located at the water line W.

The rotator can be of any prior known type, for example the type described in the application FI 20125413, which corresponds to U.S. Pat. No. 9,447,770 B2. Not being an object of this invention, the rotator is not described any further.

The generation of a gyration as pure as possible is particularly important in an irregular wave in order to enable continuous rotational motion and energy production as consistent as possible. Over a short time span, the period of a wave remains reasonably well constant, but the amplitude fluctuates a lot. When the body reaches deep into water, the most significant and most regular large wave has a pronounced influence in the generation of motion, while small waves working just in the proximity of the surface remain rather insignificant.

In this device, the rotator exploits not only a rotating moment generated by inclination (gyration) and gravity but also a moment generated by pitching-directed acceleration. Acceleration is co-directional with the wave propagation direction. At the instant of maximum acceleration, with a proper phase angle (90°) between rotator and acceleration, this moment works at the right time in the right direction.

In this device, the lateral inclination from side to side does not bring about horizontal acceleration in a vertical position of the rotator, because the inclination from side to side takes place more or less around the vertical position of the rotator. If the rotator were to be placed alternatively above the water level, this would also result in some lateral acceleration that would be exploitable.

The "axis" of pitching lies below the depth of influence of a wave, hence always below the bottom edge of the device. This is because, when extracting power, there is generated an anti-pitching moment which opposes "pivoting" of the device along with a wave and thereby shifts the axis to a position lower than where the wave has its lowest level of influence (the wave axis).

The mooring for a power plant body of the invention can be effected with chains commencing down from bottom corners of the body and terminating in weights 6 and 7 located near the sea floor. From these weights commence horizontal moorings, which hold the device in position but allow a vertical movement.

The mooring weights may differ in design, such that one weight 7 moves easily in vertical direction (streamlined high shape) and the other weight 6 opposes the vertical movement (flat). The anti-movement flat weight 6 is placed at the edge where the vanes are in a low position. Thereby, the mooring contributes to swaying and participates in energy production.

The horizontal component of mooring force generates at the attachment points in a lower part of the device a fluctuating force in the wave propagation direction. This force and its fluctuation support a desired motion and energy production.

The horizontal mooring members are arranged in such a way that the orientation of the device in a wave arriving direction (to a sufficient extent) occurs by itself. The two foremost lines converge (terminate near each other), thus providing a point for the device to revolve around. When the device is in the mid-position of a desired orientation sector, the rear mooring lines must be located on a directional extension of the front mooring lines. The mooring lines are slightly slack and about twice longer than the front lines, thus enabling the device to revolve around the confluence point of the front lines. A suitable angle for the lines at the front mooring point is perhaps about 30°.

The mooring weights are constructed with tanks for floating the same in an installation and transport process. When the tanks are filled with water, the mooring is pulled by the weights to a correct setup. The tanks must have dimensions that enable the sinking thereof faster than the power plant itself in wave motions. It is ensured thereby that the lines do not become occasionally slack, which would result in major load spikes.

A power cable enters the water from a lower section of the device and is extended to the sea floor from the vicinity of the front mooring lines' confluence point (from the front of it). The cable is provided with elasticity by appropriate dimensioning and floats for keeping it out of contact with the moorings.

The device has its bottom edge provided with water tanks, which, when empty, turn the device over onto its flat side for transport. In a full condition, the tanks keep the device in a proper upright position.

In the embodiment of FIG. 3, the body has a parallelogram shape in a view perpendicular to the plane of the body 1. The top and bottom edges are horizontal. Hence, the horizontal flanges are slightly farther (horizontally) away from each other and provide a greater force.

As a result of constant tilting of the body, the rotator 3 has the plane of its trajectory constantly tilting relative to the horizontal plane and the rotator 3 is subjected at the same time to reciprocating horizontal accelerations. Since the floating body has been designed as a deeply submerged vertical wall, the moment generated by tilting in a direction perpendicular to its plane and by gravity and the moment generated by horizontal acceleration both occur substantially at the same time and in the same direction. The aggregate moment of these can be further equalized with a gyro-generated moment.

During the wave power plant operation, the mutual timing and magnitude of moments can be influenced by adjustment of the gyro spinning speed and by adjustment of the rotator's angular position relative to the direction of tilt. The latter can be adjusted by a generator load and also by adjustment of the gyro spinning speed.

The arrival direction of waves is perpendicular to the plane of the body 1.

The invention claimed is:

1. A wave power plant, comprising a body configured to have a vertical main plane in still water, said body being provided with a space configured to accommodate a rotator, whereby the body is moored to a position with its main plane transverse to the propagation direction of waves, characterized in that in the propagation direction of waves the body has a dimension which is shorter than the draft of the body, and that the body has diagonally opposite corners provided with fins or vanes, which protrude from the body from the main plane in said opposite corners and which effect rolling of the body in a lateral direction around an axis perpendicular to the main plane, in response to the vertical motion of water.

2. A wave power plant as set forth in claim 1, wherein over 80% of the body height is in submersion.

3. A wave power plant as set forth in claim 1, wherein the space is in the submerged part of the body or at water line.

4. A wave power plant as set forth in claim 1, wherein the fins or vanes are horizontal at least over a portion a length thereof.

5. A wave power plant as set forth in claim 1, wherein the fins are provided fixedly on the body.

6. A wave power plant as set forth in claim 1, wherein the fins or vanes are on both sides of the main plane and protrude from the main plane in a direction perpendicular to the main plane.

7. A wave power plant as set forth in claim 1, wherein a buoyancy-generating volume of the body above water level or at water line diminishes towards a side edge of the body at which the fins or vanes are located in a low position.

8. A wave power plant as set forth in claim 1, wherein along a side edge of the body, at which the fins are located in a high position, the buoyancy-generating volume of the body above water level is large with respect to the rest of a body element for providing a float above the fins or vanes.

9. A wave power plant as set forth in claim 1, wherein the body is dimensioned to extend in vertical direction to a depth equal to where wave motion exists.

10. A wave power plant as set forth in claim 1, wherein a portion of the body, which penetrates the water surface, is narrow in the propagation direction of a wave, being not more than 30% of the draft of the body.

11. A wave power plant as set forth in claim 1, wherein a vertical motion resisting, horizontally flat mooring weight is attached to that side edge of the body or in the proximity of that side edge of the body at which the fins or vanes are located in a low position, and that a vertically more readily movable mooring weight is attached to or in the proximity of the opposite side edge.

12. A wave power plant as set forth in claim 1, wherein a portion of the body, which penetrates the water surface, is narrow in the propagation direction of a wave, being not more than 20% of the draft of the body.

\* \* \* \* \*